Nov. 3, 1970   M. G. WEBB   3,537,267
STORAGE OF LIQUIDS
Filed Nov. 16, 1967
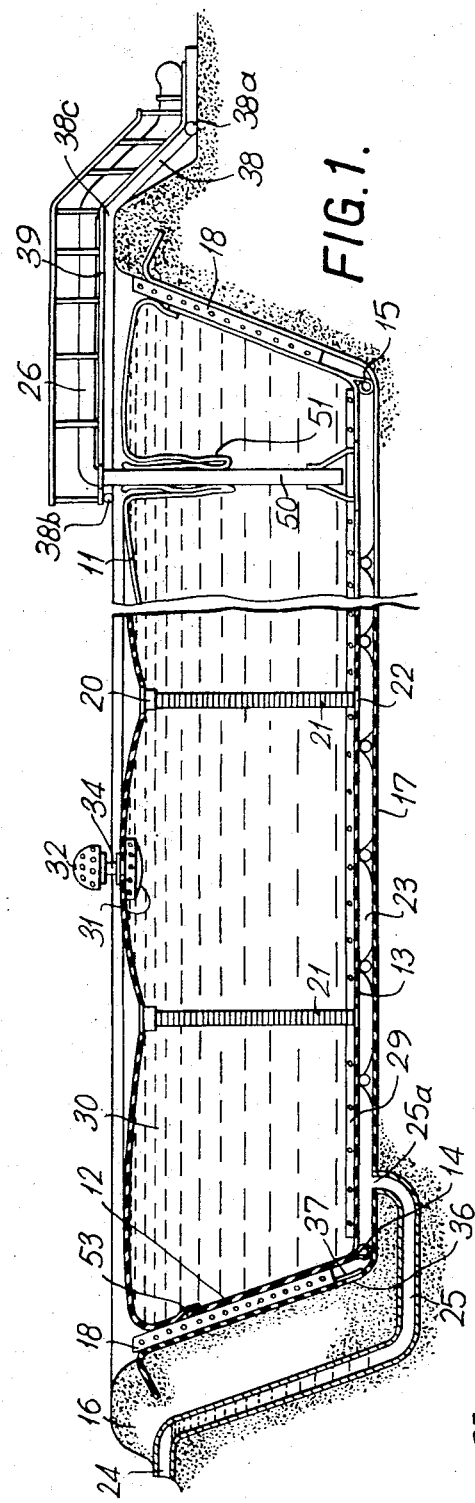
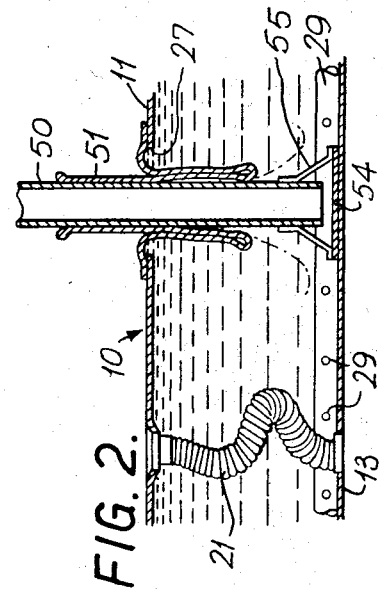
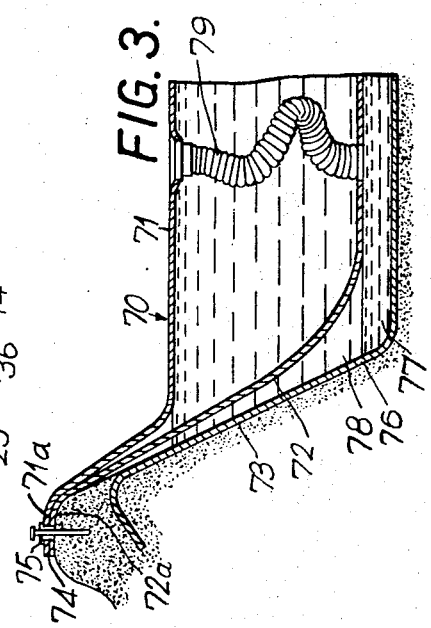

3,537,267
STORAGE OF LIQUIDS
Michael Guthrie Webb, Wotton Bridge, Isle of Wight, England, assignor to National Research Development Corporation, London, England, a corporation of Great Britain
Filed Nov. 16, 1967, Ser. No. 683,605
Claims priority, application Great Britain, Nov. 18, 1966, 51,859/66
Int. Cl. B65d 25/24; B65g 5/00
U.S. Cl. 61—.5
13 Claims

ABSTRACT OF THE DISCLOSURE

There is described an installation for storing liquid. The installation comprises a pit and a tank the sides of which engage the sides of the recess. There is liquid beneath the tank a small portion of which is displaced upwardly around the sides of the tank as the tank is filled. The tank is formed of unreinforced flexible sheet material.

---

The present invention relates to the storage of liquids, such as oils or water.

It is already known to store liquids in land-based tanks made from flexible sheet material in which the hydrostatic pressure of the stored liquid is resisted by hoop stresses in the flexible sheet material of the tank. The storage capacity of these known tanks is limited by the strength of the material of which they are constituted and where it is desired to provide a tank of relatively large storage capacity, a material having a correspondingly high tensile strength must be employed.

In known tanks formed of flexible sheet material and of the order of 300 cubic metres, the flexible sheet material has to have a tensile strength of the order of 1000 lbs. per inch width. The tensile strength of the material is mainly provided by a woven fabric, such as nylon cloth, and the fabric is rendered impermeable to the liquid to be stored by a layer of rubber or other impermeable material which is calendered on one or both sides of the fabric. For large capacity tanks, the fabric needs to be woven from relatively coarse warp and weft threads and the quantity of rubber which is necessary to cover and, to some extent, to penetrate, the fabric becomes relatively large. As a result, the proofed fabric for such large tanks is expensive and sufficiently heavy to offset, at least to some extent, the advantages of such tanks as regards portability. Furthermore, the composite nature and thickness of the proofed fabric lead to difficulties in forming reliable joints between adjacent sheets of proofed fabric during the manufacture and use of the tank.

According to one aspect of the present invention, there is provided an installation for storing liquids comprising means defining a recess and a tank received in the recess, the walls of the tank being formed at least partly of unreinforced flexible sheet material which is impermeable to the liquid which is to be stored, the installation being so constructed and arranged that when a liquid is stored in the tank, the sides of the tank cooperate with the walls of the recess.

When liquid is stored in the installation, the cooperation between the sides of the tank and the walls of the recess ensures that any hydrostatic loads on the flexible sheet material of the tank produced by the stored liquid are resisted by the cooperating walls of the recess. The flexible sheet material of the tank thus does not require the tensile strength which has been necessary to resist the hydrostatic loads set up by stored liquid in tanks previously made from flexible sheet material, and the material serves only to provide separation of the stored liquid from the walls of the recess and from the atmosphere. Unreinforced sheet material is cheaper than reinforced sheet material having the same degree of impermeability and provides benefits in that during the fabrication of the tank, panels of unreinforced sheet material can be attached to each other to form impermeable joints by a comparatively simple but reliable technique and in that the unreinforced sheet material is relatively elastic so that the tank in the installation according to the said one aspect of the invention will readily conform to the contours of the walls of the recess, whereby the sides of the tank and the walls of the recess will cooperate during use of the installation.

According to another aspect of the invention, there is provided a tank for use in the installation, the tank being formed, at least in part, from unreinforced flexible sheet material which is impermeable to the liquid which is to be stored in the installation and which has a strength less than that which would be required to resist forces thereon due to liquid stored in the tank if the sides of the tank were not supported in use.

Normal operational loads on the tank which the material of the tank must be strong enough to resist are the stresses which the material of the tank will need to bear during manufacture, handling, transportation and use in the installation, including, in some instances, inspection by workers supported by the top of the tank, and such loads are likely to be considerably smaller than the loads normally expected during the use of the previously-proposed tanks. For the contemplated sizes of the tank and installation according to the invention, the cost of providing a recess to receive the tank is more than offset by the cost advantages resulting from the use of unreinforced flexible sheet material.

There may be, on the bottom of the recess, at least one layer of liquid having a density of the same order as the density of the liquid which is to be stored. In most instances, the density of the layer of liquid would be substantially equal to, or greater, than the density of the liquid which is to be stored. Where such a layer of liquid is provided, any stored liquid will, in effect, float on, and displace, liquid from the layer so that the hydrostatic head of the stored liquid is equal to the hydrostatic head of the layer liquid at the level of the effective interface of the two liquids. The displaced layer liquid will rise between the sides of the tank and the cooperating walls of the recess to a height in accordance with the relative densities of the two liquids. The displaced layer liquid, in effect, acts as a lubricant between the tank and the cooperating walls of the recess so that folds in the material of the tank can straighten out relatively freely as the tank is filled, thus minimising the risk of tearing of the material of the tank due to unrelieved stress concentration at folds trapped in the material. If the density of the layer liquid is only slightly greater than the density of the stored liquid, the layer liquid will be displaced almost to the top level of the stored liquid, and any folds in the tank will be able to straighten out with substantially complete freedom almost to the level of the liquid in the tank. Thus, if the installation is to be used to store drinking water, the layer liquid may comprise water in the form of, e.g. fresh-water or sea-water so that by virtue of the similarity in densities, the layer liquid will act as a lubricant between the tank and the cooperating walls of the recess up to, or almost up to, the level of the top of the tank.

Where it is desired to prevent contact between the stored liquid and the layer liquid, as would be the case with, for instance, drinking water and sea-water, the tank may comprise a bottom of impermeable flexible sheet material which is substantially resistant to the action of the stored liquid and the layer liquid. Where there is no objection to contact between the stored liquid and the layer liquid, as might be the case when certain types of oils are to be stored and the layer liquid comprises water, the tank may be open-bottomed.

Discrete upwardly extending passages may be provided between the tank and the co-operating walls of the recess, e.g. by means of pipes which upwardly extend from the layer liquid, so that samples of the layer liquid or the air above it, can be examined for traces of stored liquid indicative of a leak or other imperfection in the tank.

Preferably, the tank is provided with at least one flexible rainwater drainage duct extending downwardly through the tank from the top thereof and which is sealed from the interior of the tank. The rainwater drainage duct is intended to prevent the formation of rainwater puddles on the top of the tank since these would locally depress the top of the tank when there is liquid stored therein, setting up stresses which otherwise would present a risk of damage to the tank. Rainwater passing into the duct is discharged beneath the tank. The weight of the rainwater drainage duct may be sufficient to ensure that while liquid is stored in the tank, the region of the top of the tank around the entrance to the duct and the entrance itself is depressed below the general level of the top of the tank so that any rainwater on the top of the tank will tend to flow towards the said entrance.

The recess may be provided at least in part by a pit in the ground, either natural or excavated, and alternatively or additionally, the sides of the recess may be provided, at least in part, by earth walls. The earth walls may be of material which has been excavated from the pit, and in installations wherein there is a layer of liquid in the bottom of the recess, the pit may be lined with a material which is impervious to the liquid of said layer so that it does not seep away. Where a liquid layer is provided, it is preferably sufficiently deep to cover any irregularities in the floor of the recess, so that, in installations having open-bottomed tanks, there is substantially no contact between the stored liquid and the floor of the recess and in installations having closed-bottomed tanks, there is substantially no contact between the bottom of the tank and the floor of the recess, thus avoiding stress concentrations in the bottom of the tank.

The filling and emptying of the tank may be effected through an aperture in the top of the tank, and there may be a frusto-conical sleeve of flexible sheet material connected by the edge region of its larger end to the edge region around the said aperture and by the edge region of its smaller end to a substantially vertical transfer pipe. When the quantity of liquid stored in the installation changes, the top of the tank moves vertically relative to the vertical transfer pipe and the connection between the tank and the pipe is maintained by the sleeve which can fold back on itself, when the top of the tank approaches the pipe. The vertical transfer pipe may be connected to a substantially horizontal transfer pipe which is cantilevered out over the tank from the side of the recess. In installations having closed-bottomed tanks, there may be provided elongate members such as tubes (which may be perforated) or rods radiating towards the sides of the tank from the vicinity of the said aperture so that as the tank is emptied, the top is prevented from co-operating with the bottom of the tank, at least in the region of he elongaed members, thereby to avoid the formation of a pocket which is sealed from the aperture. Preferably the elongate members are of a material having a density similar to that of the liquid which is to be stored so that if the members should rest on the bottom of the tank, the localised additional weight to be supported by the bottom of the tank will be as small as possible and the strength requirement for the bottom of the tank will accordingly also be as small as possible.

There may be means for venting to atmosphere any gases which collect inside the tank above the stored liquid.

The invention will now be described, by way of example only, with reference to the accompanying drawings, in which:

FIG. 1 shows in vertical cross-section one form of installation for storing oil in accordance with the invention, the installation being depicted with its storage capacity in full use, FIG. 2 is a view to a larger scale of part of the installation of FIG. 1 when only part of its storage capacity is in use, and FIG. 3 is a vertical cross-sectional view of part of another form of installation in accordance with the invention, the storage capacity of the installation being almost fully in use.

The installation of FIG. 1 comprises a square pit 15 formed in the ground. As depicted the pit 15 is continued above the general ground level by the provision of earth walls 16, and if the pit 15 has been artificially excavated, the earth walls 16 may conveniently be formed from the earth excavated from the pit 15. The side walls of pit 15 are suitably sloped outwardly so that they will not collapse. The bottom of the pit 15 may be, for example, 200 feet square and the slope of the side wall between 45 degrees and 60 degrees to the horizontal, and the mean depth of the pit 15 below the top of the earth walls 16 about 30 feet.

The pit 15 has a lining 17 of waterproof sheet materials and the top edges of the lining 17 are embedded in the earth wall 16 to prevent damage to them and to anchor the lining 17. Since, as will be later seen, the lining 17 in this example will normally only be exposed to water, it may be formed from relatively cheap materials such as polyethylene, polyvinyl chloride or butyl rubber. A quantity of water is provided in the pit 15 so as to form a layer 23 above the lining 17 due to irregularities in the bottom of the pit 15.

A tank, generally indicated by reference numeral 10, and square in plan, is received in the pit 15 generally above the water layer 23. The tank 10 has a top wall 11, side walls 12 and a bottom wall 13 formed from panels of unreinforced sheet polyvinyl chloride-nitrile rubber having a thickness of about 50 thousandths of an inch and a dry tensile strength of about 120 pounds per inch width. When the rubber is contacted with oils, especially light aromatic fractions, its tensile strength falls, and may fall as low as 10 pounds per inch width. As illustrated, the bottom edges of the side walls 11 have a beading 14 enclosing a tube containing ballast, which may be, for example, moist sand. The ballast serves only to maintain the tank 10 with its top wall 11 uppermost and, in certain circumstances, e.g. where the density of the stored oil approaches that of the water in layer 23, the ballast may not be necessary.

The top wall 11 of the tank 10 has a number of heavy apertured flanges 20 which form the upper ends of rainwater drainage ducts 21 of flexible hose. The lower ends of the drainage ducts 21 are sealed to the peripheries of apertures in the bottom wall 13 and are open to the water layer 23. The weight of the flanges 20 ensures that when the installation is in use the top wall 11 will be depressed in the region of the flanges 20 and any rainwater on the top wall 11 will readily flow towards the depressed regions and drain via the ducts 21 into the water layer 23. In the absence of such provision for rainwater drainage, there would be a risk that puddles would form on the top wall 11, and the weight of water in the puddles would strain and possibly damage the top wall 11.

Any gases which may be trapped in the tank 10 can be vented through a one-way vent-valve (not visible) disposed in a radially-apertured float 31 which allows the gases to pass to atmosphere through a venting pipe 34 in the top wall 11, and a flame-trap 32. The float 31 is radially apertured so that gases trapped on the underside of the top wall 11 can escape without there being any substantial risk that the apertures will be blocked by folds in the material of the top wall 11.

A stout pipe 38 having a right-angled elbow 38a, 38b, at each end and a bend 38c between the elbows 38a, 38b is arranged with one elbow 38a buried in the ground outside the earth walls 16 and with the other end cantilevered out over the tank 10 from the earth walls 16. The pipe 38 forms a support for a gangway 39 and a transfer or supply line 26. The supply line 26 terminates over the tank 10 in a substantially vertical pipe 50 which extends into the tank 10 through an aperture 27 in the top wall 11. A connection is provided between the pipe 50 and the interior of the tank 10 by means of a frustoconical sleeve 51 of nylon reinforced rubber which is substantially coaxial with the vertical pipe 50 and which is bonded to the pipe 50 by the edges of its narrower end and to the edge regions of the aperture 27 in the top wall 11 by the edges of its wider end.

As will be seen from FIG. 1, the arrangement of the sleeve 51 is such that when the tank 10 is full and the top wall 11 is in its highest position, the sleeve 51 is doubled back on itself, and as will be seen from FIG. 2, as the tank 10 is emptied, the top wall 11 is free to sink downwardly while the sleeve 51 progressively assumes a frusto-conical form, shown in chain lines. The attachment between the wider end of the sleeve 51 and the edge region of the aperture 27 is obtained by overlapping the edge region of the sleeve 51 and the top wall 11 with a ring of uncured polyvinyl chloride-nitrile rubber in between and subjecting the edge regions and the ring of rubber to the action of heat until a bond is produced. The lap joint thus formed is capable of carrying tensile loads in the plane of the joint and is relatively flexible. Lap joints are employed elsewhere in the tank 10 for joining panels of polyvinyl chloride-nitrile rubber, e.g. the lap joint 53, FIG. 1.

A circular steel plate 54 is attached transversely of the pipe 50 and spaced slightly from the open end thereof by means of struts 55. The plate 54 is intended to prevent the bottom wall 13 from being sucked upwardly and blocking the open end of the pipe 50 when the contents of the tank are being discharged therefrom.

When the tank 10 is empty the top wall 11 will lie against the bottom wall 13 and the side walls 12 will be crumpled against the side walls of the pit 15. Those parts of the tank 10 containing unvented gases, such as air, will float on the water layer 23 while other parts will be partly or wholly submerged.

When oil is pumped into the tank 10, it will spread throughout the tank, raising the top wall 11 relative to the bottom wall 13. The tank 10 will eventually be wholly buoyant, and will rest above the water layer 23. As the tank 10 is filled, it will displace water from the water layer 23 into the region between the side walls 12 of the tank and the lining 17 on the sides of the pit 15 so that the hydrostatic head of water in this region balances the hydrostatic head of oil in the tank 10. It is to be appreciated that the oil in the tank 10 will press the side walls 12 outwardly against the lining 17, and hence the quantity of water from layer 23 which can intrude between the side walls 12 and the lining 17 will be very small. Thus, even when the tank 10 has been filled with oil, the quantity of water displaced from layer 23 will be so small that the height of the bottom wall 13 above the bottom of the pit 15 will not substantially have altered since the tank 10 was empty; accordingly the bottom wall 13 will be free from the stresses which would otherwise occur were the quantity of water in layer 23 to vary substantially. In order to ensure that water can be displaced from the layer 23 into the region between the side walls 12 of the tank 10 and the lining 17, there may be provided, as shown, a number of short lengths of pipe or rod 19 which extend under the beading 14, and thus produce folds or wrinkles in the side walls 12 which act as channels for the water. Water from layer 23 will also be displaced into the rainwater drainage ducts 21 to the same height as the water surrounding the side walls 12 of the tank 10, but here again, the quantity of water lost from layer 23 will be so negligible as not to affect the disposition of the bottom wall 13.

The lining 17 at the bottom of the pit 15 is apertured at 25a so that the pit 15 communicates with an overflow pipe 25. The level of the open end 24 of the overflow pipe 25 determines the maximum level which the water from layer 23 can attain. Thus, in the event of prolonged heavy rain, rainwater reaching layer 23 through the drainage ducts 21 would cause an amount of water, equal to the amount of rainwater, to flow out of the overflow pipe 25. The provision of the overflow pipe 25 ensures that the tank 10 will not be raised by water accumulating in layer 23 to such a height that any part of it is higher than the top of the pit 15. The open end 24 of the overflow pipe 25 is at a level below the top level of the lining 17 so that water cannot rise above the lining 17 and then seep into the earth walls 16 and damage them. It is contemplated that installations according to the invention may be provided with an overflow pipe 25 having an outlet 24 whose vertical height can be adjusted to take account of any variation in the relative densities of oils which are stored and the water in the pit 15.

When the tank 10 is full, as illustrated, the outward lateral forces on the side walls 12 due to the contained oil will be zero at the level of the top wall 11 and will increase downwards linearly as far as the level of the displaced water between the side walls 12 and the lining 17. Thereafter, the outward lateral force due to the hydrostatic head of oil in the tank 10 will be countered, in a degree which increases with depth, by the inward lateral force due to the hydrostatic head of the water, and at the level of the bottom wall 13 where the hydrostatic heads of the oil and the water are equal there will be no lateral force on the side walls 12. It will be appreciated that because the maximum lateral force on the side walls 12 (at the level of the displaced water) will be equivalent only to the head of oil above the level of the displaced water, the material of the side walls 12 will be subjected to lateral loads of a relatively small magnitude. The relatively small magnitude of the lateral loads enables any folds in the material of the side walls 12 to be straightened out as the tank 10 is filled without the generation of relatively large tensile forces in the material of the tank.

The lining 17 at the side of the pit 15 near the bottom thereof has an aperture 36 which is closed by a hinged flap 37. The flap 37 acts as a valve and is hingedly attached to the lining 17 by its upper edge so that it is normally held closed by gravity and by the water in layer 23. If the level of the water table in the surrounding ground should rise above the maximum level of the water in the pit 15, there is a risk that the lining 17 will be lifted from the bottom of the pit 15. However, in such circumstances the flap 37 will be hinged away from the lining 17 by the pressure of the water in the ground, this allowing a flow of water to take place until the heads of water inside and outside the pit 15 are substantially equalised, so that the lifting forces acting on the lining 17 are eliminated. The aperture 36 and flap 37 are disposed above the bottom of the pit 15 so that if the flap 37 should fail to close the aperture 36 when the ground water level has fallen below the level of the water layer 23, there will always be enough water in the layer 23 to prevent substantial contact between the bottom wall 13 of the tank 10 and the lining 17 at the bottom of the pit 15. Instead of the hinged flap 37, a suitable non-return valve (not shown) may be employed in the aperture 36.

Alternatively, where there is unlikely to be any tendency of the ground water to enter or leave the pit 15, e.g. because the ground is already water-logged or totally impervious, the lining 17 may be dispensed with. For more permanent installations the pit 15 may be lined instead with concrete or asphalt or clay in which cases no aperture 36 and flap 37 would be necessary.

As shown, a number of rigid perforated pipes 18 rest on the sloping sides of the pit 15 in vertical planes in spaced-apart locations between the side walls 12 of the tank 10 and the lining 17. Water which has been displaced from layer 23 to the region between the side walls 12 of the tank 10 and the lining 17 passes into the pipes 18; the level of the water in the pipes 18 will be the same as the level outside the pipes 18. In the event of a leakage of oil from the tank 10, a film of oil will spread over the surface of the water between the side walls 12 of the tank and the lining 17, and the film will be detectable by taking samples from the water in the rigid pipes 18 or from the air immediately above the water. In instances when the tank 10 has no ballast in the beading 14, the side walls 12 of the tank 10 may be sufficiently wrinkled by the rigid pipes 18 to allow communication between the water layer 23 and the space between the side walls 12 of the tank 10 and the lining 17, and the previously mentioned lengths of pipes or rod 19 may be dispensed with.

When the tank 10 is being emptied, the top wall 11 sinks towards the bottom wall 13 while the side walls 12 crumple and fold, and the rainwater drainage ducts 21 flex from the substantially straight configuration they have in the full tank 10, as illustrated. When the tank 10 is nearly empty, there is a possibility that the top wall 11 will co-operate with the bottom wall 13 and seal off pockets of oil. This is undesirable since it would then not be possible to remove all the oil from the tank 10, and there would always be a potential fire risk, even with an apparently empty tank. Accordingly, a number of tubes or bars or material of approximately the same density as the oil are disposed in the tank 10 and which radiate from a vicinity more or less vertically below the outlet connection flange 27. In the illustrated example, perforated tubes 29 of polyethylene are provided, so that however strong the contact may be between the top wall 11 and the bottom wall 13 in some parts of the tank 10, there will always be some communication between other parts of the tank 10 with the outlet connection flange 27 either through the tubes 29 or through channels formed between the top wall 11 and the bottom wall 13 by the interposition of the tubes 29. The provision as to the density of the material of the tubes 29 is to ensure that they will not impose any substantial load on the bottom wall 13 due to their weight.

It may be desirable from time to time to determine the quantity of oil stored in the tank 10.

One convenient method of measuring the quantity of stored oil is by noting the difference in levels between the oil in the tank 10, given by the level of the top wall 11, and the level of water in the rainwater drainage ducts 21 or the pipes 18. If the mean densities of the oil and water are known, then the difference in levels will be a measure of the total depth or head of oil floating on the water. It will be necessary to provide a correlation between the depth or head of oil, the height of the top wall 11 of the tank 10 in the pit 15 and the corresponding quantity of oil, to take account of the slope of the walls of the pit 15. Thus if the measured difference in the levels of an oil of known density $d_1$ and water of known density $d_2$ is $h$, the total depth or head of oil is given by $$L_1 = \frac{d_2 h}{d_2 - d_1}$$

The correlation tables or graph for the pit 15 will enable the volume of oil in the tank 10 to be determined for the calculated value of $L_1$ and for the particular level of the top wall 11 in the pit 15 at the time of measurement. The level of the top wall 11 in the pit 15 can be determined from, for instance, markings on the sleeve 51, and the difference in levels of the water and oil by means of a float in the rigid pipes 18 or in the rainwater drainage ducts 21.

Another convenient method of determining the depth of head $L_1$, of the oil is by measuring the pressure of a gas which is blown into the oil at approximately the level of the bottom wall 13. Preferably the gas would be an inert gas such as carbon dioxide or nitrogen and would be blown in from a tube extending downwardly from the top wall 11 so that its lower end rests lightly on the bottom wall 13 beneath the float 31. The gas blown from the tube into the tank would be vented to atmosphere via the venting pipe 34. The back pressure of the gas would be equal to the hydrostatic pressure of the oil, and a suitable correlation would enable the quantity of oil in the tank 10 to be determined from the level of the top wall 11 in the pit 15 and the back pressure of the gas.

When the tank 10 has been completely emptied, it may be folded for transportation or storage.

It is contemplated that the tank 10 may be used for storing liquids other than oil products, for example, the tank may be used to store drinking water. In installations for storing drinking water where a layer 23 of liquid is interposed between the bottom wall 13 of the tank 10 and the bottom of the pit 15, it may be convenient to provide sea water in the layer 23 so that the density of layer 23 exceeds the density of the stored liquid.

In installations in which the tank 10 is an open-bottomed tank (e.g. where oils are to be stored which are not affected by a water layer such as layer 23), either the whole or a central region of the bottom wall 13 is omitted from the tank 10 together with the whole or a corresponding part of the perforated tubes 29 of FIGS. 1 and 2.

In the installation of FIG. 3, the tank 70 is formed from two sheets 71, 72 of unreinforced polyvinyl chloride-nitrile rubber, each having approximately the same outline and dimensions as the plan view of the pit 73 in which the tank 70 is to be received. During the manufacture of the tank 70, the sheets 71, 72 are arranged with corresponding parts of their respective peripheral regions 71a, 72a congruent. A strip of uncured rubber is disposed between the peripheral regions 71a, 72a and heat is applied to the peripheral regions 71a, 72a while they are pressed into firm contact with the uncured rubber strip. The heat may be from heated pressure pads in contact with the regions 71a, 72a, and serves to form an impermeable bond 74 between the peripheral regions 71a, 72a as the rubber strip becomes cured. A number of metal eyelets 75 are inserted through the bonded peripheral regions 71a, 72a, and an aperture corresponding with the aperture 27 of FIGS. 1 and 2 is formed in the top sheet 71 so that a liquid which is to be stored can be supplied between the sheets 71, 72. A connection is provided with a liquid transfer pipe (not shown) corresponding with the pipe 50 of FIGS. 1 and 2, and the connection may be by means of a frusto-conical sleeve of flexible sheet material as depicted in those figures.

The tank 70 is arranged in congruence with the pit 73 and metal pegs are driven through the eyelets 75 into the ground so that the peripheral regions 71a, 72a of the tank 70 are fixed at the periphery of the pit 73. While the tank 70 is empty of liquid, both the top and bottom sheets 71, 72 will sag to the bottom of the pit under their weight. The sagging will not be substantially detrimental to the tank 70 since unreinforced polyvinyl chloride-nitrile rubber can accommodate stretching of 200–300% before its tensile limit is approached, and for the ranges of dimensions contemplated for installations according to the invention, the maximum stretch to be expected would be of the order of 5% overall, although it is conceivable that in certain parts of the tank 70, this figure would be exceeded in an acceptable degree while in other parts it would not be attained.

As the tank 70 is filled, the top sheet 71 is upwardly separated from the bottom sheet 72. Air vents (not shown), such as the air venting arrangement 31, 32, 34 of FIG. 1, are provided at suitable locations in the top sheet 71 so that the sheets 71, 72 are only separated by liquid and so that in the absence of liquid, the sheets 71, 72 enables the tank 70 to conform closely to the shape of the pit 73 with little strain.

There may be liquid in the pit 73 below the tank 70 sufficient in depth to cover any irregularities in the floor of the pit 73 and the pit 73 may be lined with impermeable sheet material 76 so that the liquid does not seep away. In the illustrated installation, there are two layers of liquid in the pit 73, the lower layer 77 being of water and the upper layer 78 of a liquid which, ideally, has the same density as the stored liquid although it may have a slightly greater or smaller density than the liquid which is to be stored. The quantity of liquid, for example oil, in the upper layer 78 need only be very small. As the tank 70 is filled, the oil layer 78 will be displaced between the sides of the tank 70 and the sides of the pit 73 to a level only slightly less than the level attained by the oil in the tank 70, in accordance with the relative densities of the two oils. Accordingly, the level of the oil above the level of the oil layer 78 urging the sheet 72 into contact with the sides of the pit 73 is very small, and friction between the sheet 72 and the sides of the pit 73 will be so low that any folds in the sheet 72 which are pressed against the sides of the pit 73 will be straightened out as the tank 70 is filled without there being any substantial risk of generating tensile forces which might disrupt the sheet 72 in the neighborhood of the folds.

The tank 70 is provided with rainwater drainage ducts 79 of a like nature to the ducts 21 of FIGS. 1 and 2 so that rainwater falling on the top sheet 71 can drain to the water layer 77 avoiding the risk of forming puddles on the top sheet 71 of the tank 70. The installation of FIG. 3 may be provided with a water overflow pipe corresponding with the pipe 25 of FIG. 1 for regulating the maximum level of liquid in the pit 73 and, where the ground surrounding the installation is likely to be waterlogged, with a flap valve in the lining 76 corresponding to the valve 36, 37 to prevent the lining 76 from being floated upwardly in the pit 73.

Although the tank 70 has been described as being formed wholly from unreinforced polyvinyl chloride-nitrile rubber, it is contemplated that some parts of the tank 70 which might be subject to severe duties may be formed of reinforced sheet material. For example, parts of the top sheet 71 may be provided with reinforcement strips (not shown) of proofed woven fabric so that workmen may walk on the top sheet 71 without any substantial risk of rupturing the sheet 71.

It is to be understood that whilst the two layers 77, 78 of different liquids have been described with respect to the embodiment illustrated in FIG. 3, the same or a similar arrangement may be adopted in the embodiment illustrated in FIGS. 1 and 2.

It is to be understood that the invention is not limited to the forms described in relation to the drawings. For example, the pit 15 and the tank 10 may have shapes other than square, e.g. rectangular or circular. Furthermore, the pit 15 may be wholly formed below the general ground level (for example, in a natural depression) or it may be wholly above the general ground level and be defined entirely by earth works or other forms of walls which may be permanent or readily demountable.

The installation according to the invention is cheaper than conventional above-ground tanks and can be more easily concealed for aesthetic or security reasons. Furthermore, in the case where oil is to be stored, while conventional above-ground tanks are subject to the risk that in the event of fire they might burst and allow their flaming contents to flow over the surrounding terrain, the installation according to the invention enables inflammable products to be stored in an area bounded by secure earth walls, such as the walls 16, or by the ground around the recess or pit containing the tank 10.

During normal use in the installation the material of the tank 10 will be substantially free of stress, and, as previously stated, need only be strong enough to resist the stresses likely to be met during manufacture, handling and transportation; in some instances, a tensile strength of as little as 10 lbs. per inch width may suffice, but it may be preferred to employ materials having greater tensile strengths, particularly in the case of large tanks where extra strength may be required during installation to resist the loads due to the weight of the tank. The contemplated tensile strengths contrast with the tensile strengths in the range of 500–1,000 lbs. per inch width employed in the largest flexible tanks of previously proposed form. Furthermore, it is difficult with present techniques to provide joints having a tensile strength of greater than about 1,000 lbs. per inch width between adjacent pieces of flexible sheet material, so that even if stronger material could be employed economically, the overall strength of the previously proposed tanks and therefore, their capacity, could not be increased.

Whilst the largest previously proposed flexible tanks have a capacity of the order of 300 cubic metres, it is contemplated that tanks in accordance with the invention may be constructed with capacities of 100,000 cubic metres or even larger without difficulty. A tank in accordance with the invention having a capacity of 100,000 cubic metres would weigh only about 50 tons when empty.

Whilst polyvinyl chloride-nitrile rubber has been described above as the material from which the tank is formed, it is to be understood that other materials may be used such as neoprene when oil or water is to be stored, or butyl rubber when water is to be stored.

I claim:
1. An installation for storing liquids, comprising:
a tank for the liquid to be stored;
said tank having top, bottom and side walls formed of flexible sheet material;
means defining a recess;
said recess having a bottom and side walls;
said tank being received within said recess;
said tank being of a size and shape such that its side and bottom walls are engageable with the side and bottom walls of said recess when liquid is stored in said tank;
a first liquid disposed within the recess beneath the bottom wall of the tank;
a second liquid also within said recess and outside the tank, said second liquid being of a density less than that of said first liquid disposed within the recess outside the tank; and
both of said first and second liquids being continuously present within said recess, with at least one of said liquids being present around the side walls of said tank, when the tank is being used for storage purposes.

2. An installation as claimed in claim 1, wherein:
the density of said second liquid is substantially the same as that of the liquid to be stored.

3. An installation as claimed in claim 1 including:
a lining for the recess.
said lining being impermeable to the liquid outside the tank within the recess.

4. An installation as claimed in claim 1 including:
means adapted to limit the height which liquid outside the tank can rise in the recess.

5. An installation as claimed in claim 4, wherein:
said means includes:

an overflow pipe open to the liquid in the bottom of the recess.

6. An installation as claimed in claim 1 including:
at least one rigid tubular perforate member extending upwardly between the side of the tank and the side of the recess;
said rigid tubular member having an upper end accessible for taking samples of the liquid outside the tank and within the tubular member.

7. An installation as claimed in claim 1, including:
two sheets of unreinforced flexible sheet material;
one of said sheets forming the top wall of said tank;
the other of said sheets forming side and bottom walls of said tank;
said sheets being bonded together at their peripheral margins.

8. An installation for storing liquids, comprising:
a tank for the liquid to be stored;
said tank having top, bottom and side walls formed of flexible sheet material;
means defining a recess;
said recess having a bottom and side walls;
said tank being received within said recess;
said tank being of a size and shape such that its side and bottom walls are engageable with the side and bottom walls of said recess when liquid is stored in said tank;
a first liquid disposed within the recess beneath the bottom wall of the tank;
a second liquid also within said recess and outside the tank, said second liquid being of a density less than that of said first liquid disposed within the recess outside the tank; and
at least one flexible duct adapted to extend between the top and the bottom of the tank when the tank is full; said duct providing communication between the exterior of the tank at the top and bottom of the tank.

9. An installation as claimed in claim 8, wherein:
the duct is heavy whereby the top wall of the tank is depressed around the upper end of the duct when the tank contains liquid.

10. An installation for storing liquids, comprising:
a tank for the liquid to be stored;
said tank having top, bottom and side walls formed of flexible sheet material; and the flexible sheet material of the top wall of the tank having formed therein apertures through which gases may vent to atmosphere;
means defining a recess;
said recess having a bottom and side walls;
said tank being received within said recess;
said tank being of a size and shape such that its side and bottom walls are engageable with the side and bottom walls of said recess when liquid is stored in said tank;
a first liquid disposed within the recess beneath the bottom wall of the tank;
and a second liquid also within said recess and outside the tank, said second liquid being of a density less than that of said first liquid disposed within the recess outside the tank.

11. An installation for storing liquids comprising:
means defining a recess;
said recess having a bottom and side walls;
a tank for the liquid to be stored;
said tank having a top and side walls;
said tank being received within the recess;
said tank being formed at least in part of unreinforced flexible sheet material which is impermeable to the liquid to be stored;
said tank and said recess being adapted for cooperation of the sides of the tank with the walls of the recess when liquid is stored in the tank, and including a rigid upright transfer pipe extending from a region of the tank adjacent the bottom thereof, through the top of the tank to the exterior of the tank;
said rigid upright transfer pipe being supported in its upright condition by means separate from the tank;
the top of the tank having an aperture therein through which the transfer pipe extends;
a tapered tubular member formed of flexible sheet material sealed at one end to the top of the tank around the periphery of said aperture and at the other end to said transfer pipe the arrangement of said tapered tubular member being such that when said tank is substantially empty the tapered tubular member is extended and when the tank is full the tapered tubular member is folded back on itself;
said tapered tubular member providing for all conditions of the tank a seal between the top of the tank and the transfer pipe.

12. An installation for storing liquids, comprising:
a tank for the liquid to be stored;
said tank having top, bottom and side walls formed of flexible sheet material;
means defining a recess;
said recess having a bottom and side walls;
said tank being received within said recess;
said tank being of a size and shape such that its side and bottom walls are engageable with the side and bottom walls of said recess when liquid is stored in said tank;
a first liquid disposed within the recess beneath the bottom wall of the tank;
a second liquid also within said recess and outside the tank, said second liquid being of a density less than that of said first liquid disposed within the recess outside the tank; and
a rigid transfer pipe extending from a region of the tank adjacent the bottom thereof, through the top of the tank to the exterior of the tank;
said rigid upright transfer pipe being supported in its upright condition by means separate from the tank;
the top of the tank having an aperture therein through which the transfer pipe extends;
a tapered tubular member formed of flexible sheet material sealed at one end to the top of the tank around the periphery of said aperture and at the other end to said transfer pipe, the arrangement of said tapered tubular member being such that when said tank is substantially empty, the tapered tubular member is extended and when the tank is full the tapered tubular member is folded back on itself;
said tapered tubular member providing for all conditions of the tank a seal between the top of the tank and the transfer pipe.

13. An installation for storing liquids, comprising:
a tank for the liquid to be stored;
said tank having top, bottom and side walls formed of flexible sheet material;
means defining a recess;
said recess having a bottom and side walls;
said tank being received within said recess;
said tank being of a size and shape such that its side and bottom walls are engageable with the side and bottom walls of said recess when liquid is stored in said tank;
a first liquid disposed within the recess beneath the bottom wall of the tank;
a second liquid also within said recess and outside the tank, said second liquid being of a density less than that of said first liquid disposed within the recess outside the tank;
a lining for said recess, said lining being impermeable to the liquid outside the tank within the recess; and
a one-way valve adapted to allow flow of liquid through said lining from the exterior of the lining to the interior of the lining whereby the lining is prevented from being displaced from surface to surface engagement with the recess by liquid outside the lining.

References Cited

UNITED STATES PATENTS

| | | | |
|---|---|---|---|
| 744,694 | 11/1903 | Sewall | 61—0.5 X |
| 2,211,958 | 8/1940 | Mahaffey | 61—0.5 X |
| 2,814,406 | 11/1957 | Marancik | 61—0.5 X |
| 3,052,380 | 9/1962 | Prins | 61—.5 X |
| 3,343,708 | 9/1967 | Haas | 220—26 |

JACOB SHAPIRO, Primary Examiner

U.S. Cl. X.R.

61—1; 137—236; 220—13, 18; 222—386.5